(No Model.)
J. C. SILSBEE.
LIFTING JACK.
No. 326,340. Patented Sept. 15, 1885.
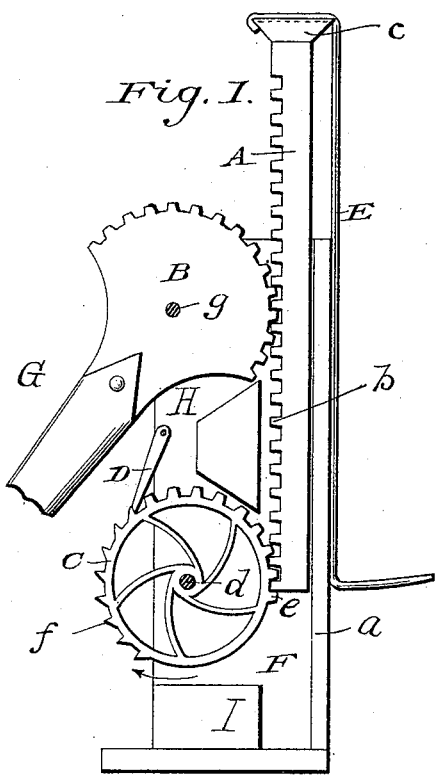
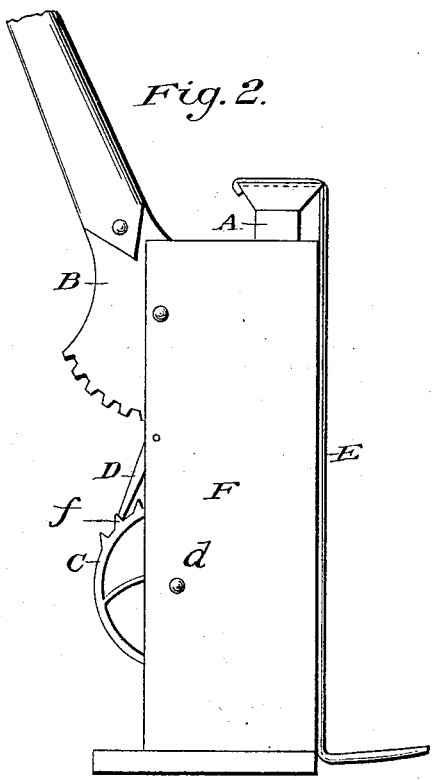
Witnesses:
John Jacobs
E. Avery
Inventor:
Jonathan C. Silsbee

UNITED STATES PATENT OFFICE.

JONATHAN C. SILSBEE, OF ARBELA, TUSCOLA COUNTY, MICHIGAN.

LIFTING-JACK.

SPECIFICATION forming part of Letters Patent No. 326,340, dated September 15, 1885.

Application filed August 21, 1884. (No model.)

*To all whom it may concern:*

Be it known that I, JONATHAN C. SILSBEE, a citizen of the United States, residing at the township of Arbela, county of Tuscola, and State of Michigan, have invented a new and useful Machine called a Lifting-Jack, of which the following is a specification.

My invention relates to lifting-jacks; and it consists in the improvements hereinafter explained and set forth.

In the accompanying drawings, forming part of this specification, Figure 1 is a vertical side elevation in section of a lifting-jack embodying my improvements, and Fig. 2 is a side elevation.

F refers to the body or case of the jack, which is provided with a front wall serving as the vertical guide for one of the faces of the lifting-bar A, which is provided on its opposite face with a series of rack-teeth, $b$, and at its upper end with an enlarged portion or head, $c$, which forms the lifting-seat.

A wheel, C, is rigidly mounted on a shaft, $d$, turning in bearings in the sides of the case or body, and the said wheel C is provided on a part of its face with a series of teeth, $e$, which are adapted to engage with the said teeth $b$ on the rear or inner face of the lifting-bar A. Another portion of the periphery of said wheel is provided with a series of inclined ratchet-teeth, $f$.

D refers to a pawl which is pivoted in the body of the case above the wheel C, and is designed to be placed in engagement with any of the ratchet-teeth $f$, so as to rigidly lock the wheel against rotation in the direction of the arrow, Fig. 1.

B refers to a segmental rack mounted upon a pivot, $g$, and provided with a handle, G, by means of which it may be vibrated or oscillated on its pivot. The relative position of the rack B is such that its teeth gear with the teeth $b$ of the lifting-bar, which is thus elevated or depressed according to the direction of oscillation of said rack B.

A block, H, is interposed between the rack B and the wheel C, and serves to both strengthen the case and also to guide the lifting-bar A between the rack B and wheel C.

I is a second block, between which and the front $a$ is formed a bearing seat or recess for the lower extremity of the lifting-bar A.

In operation the handle G is depressed so that the rack B rotates in upward direction, and thus elevates the bar A. Of course the latter by its ascent rotates wheel C, thus successively bringing the several ratchet-teeth $f$ into position to be engaged by the pawl D. Now, by reason of the inclination of said ratchet-teeth $f$, the pawl D rides freely over the same, but rigidly holds said wheel at all times against rearward rotation. When it is desired to lower the bar A, the pawl D is thrown up out of engagement from the rack-teeth, after which the bar A may be depressed.

It will be noted that the series of teeth $e$ $f$ are of approximate number, which always insures the wheel being retained in engagement with the teeth $e$, the presence of either end tooth $f$ giving a notification of the possible disengagement of the end tooth $b$. The advantage of such an arrangement provides against any further rotation of the wheel which would move the teeth out of an engaged position and permit the lifting-bar A to suddenly drop.

E refers to a metal rod, the upper end of which is bent, as represented, so as to be capable of engaging the head $c$ of the bar A, the remainder of said rod depending vertically from said head and being bent horizontally at its end. By employing said attachment the horizontal portion of said rod can be passed beneath one of the connecting-bars of a fence, and thus enable the jack to be used in moving fences.

It will be obvious that the jack herein described is of comparatively simple and inexpensive construction and most durable and effective in operation.

I claim—

The combination, in a lifting-jack, of a bar, a device—such as a segmental rack—for elevating said lifting-bar, a wheel having on a part of its face a series of inclined teeth, and a pivoted pawl for engaging said inclined teeth to lock said wheel against rearward rotation, substantially as set forth.

Dated this 1st day of August, 1884.

JONATHAN C. SILSBEE.

Witnesses:
J. L. CURRY,
JEREMIAH DIXON.